No. 889,730. PATENTED JUNE 2, 1908.
V. H. SLINACK.
PHOTOMETER.
APPLICATION FILED MAR. 16, 1908.
3 SHEETS—SHEET 1.
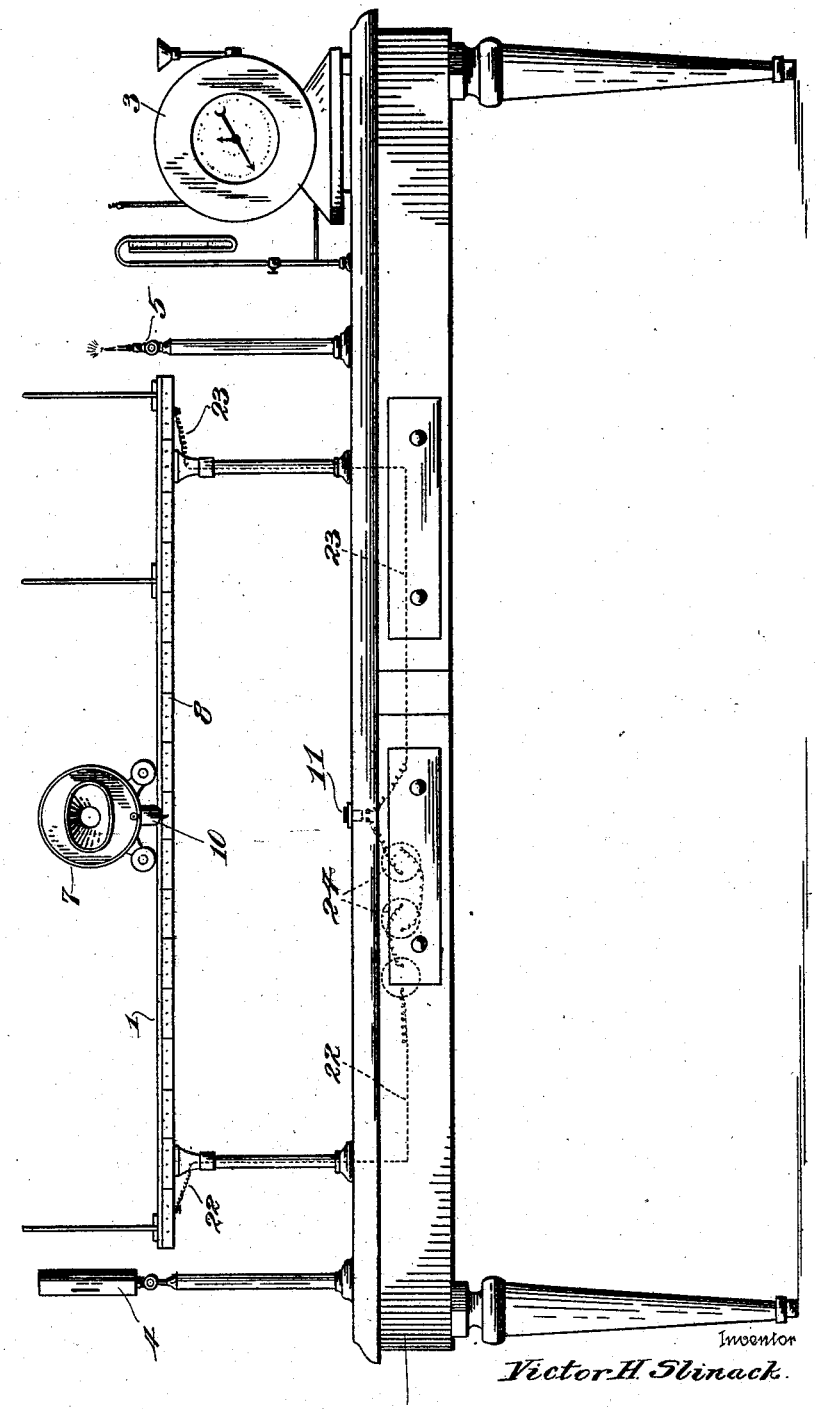
Fig. 1.
Witnesses 
Inventor
Victor H. Slinack.
By
Augustus B. Stoughton.
Attorney

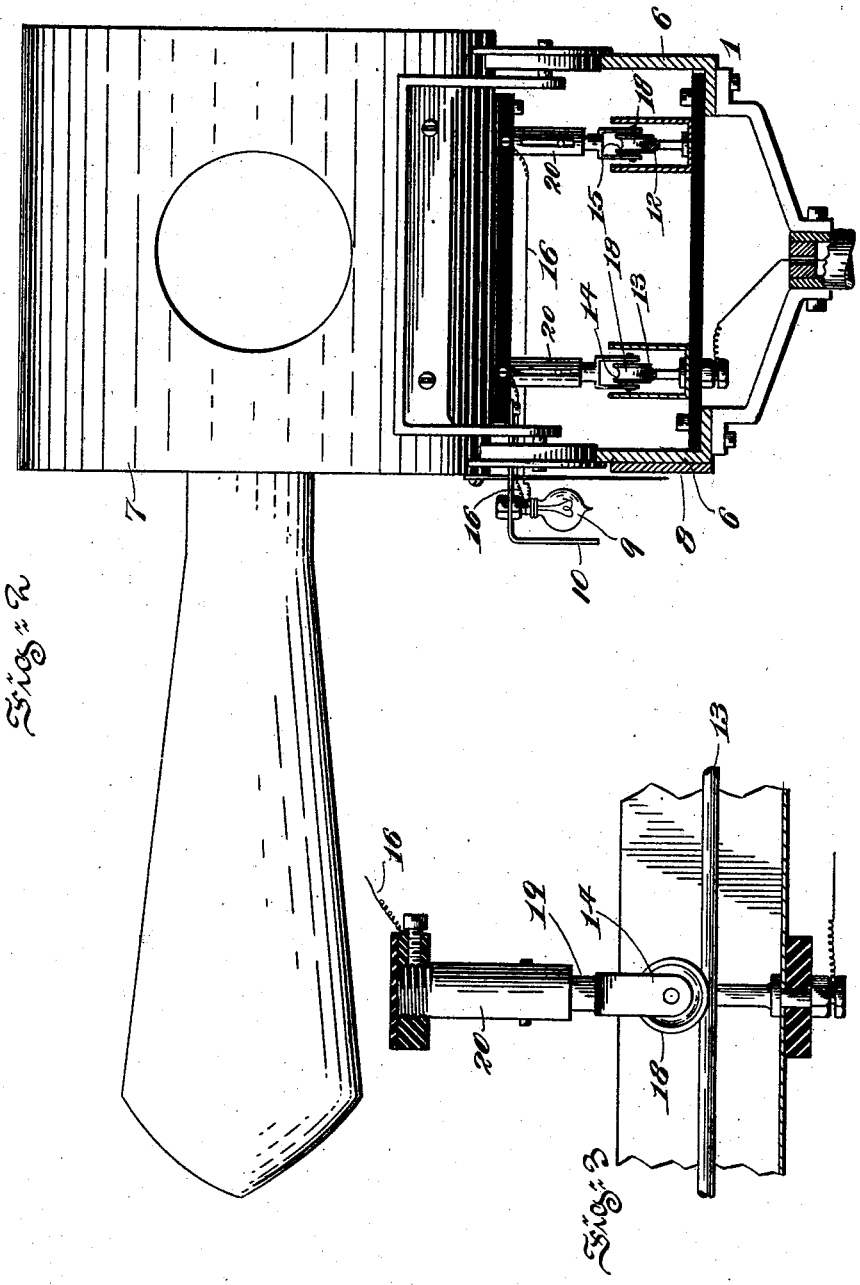

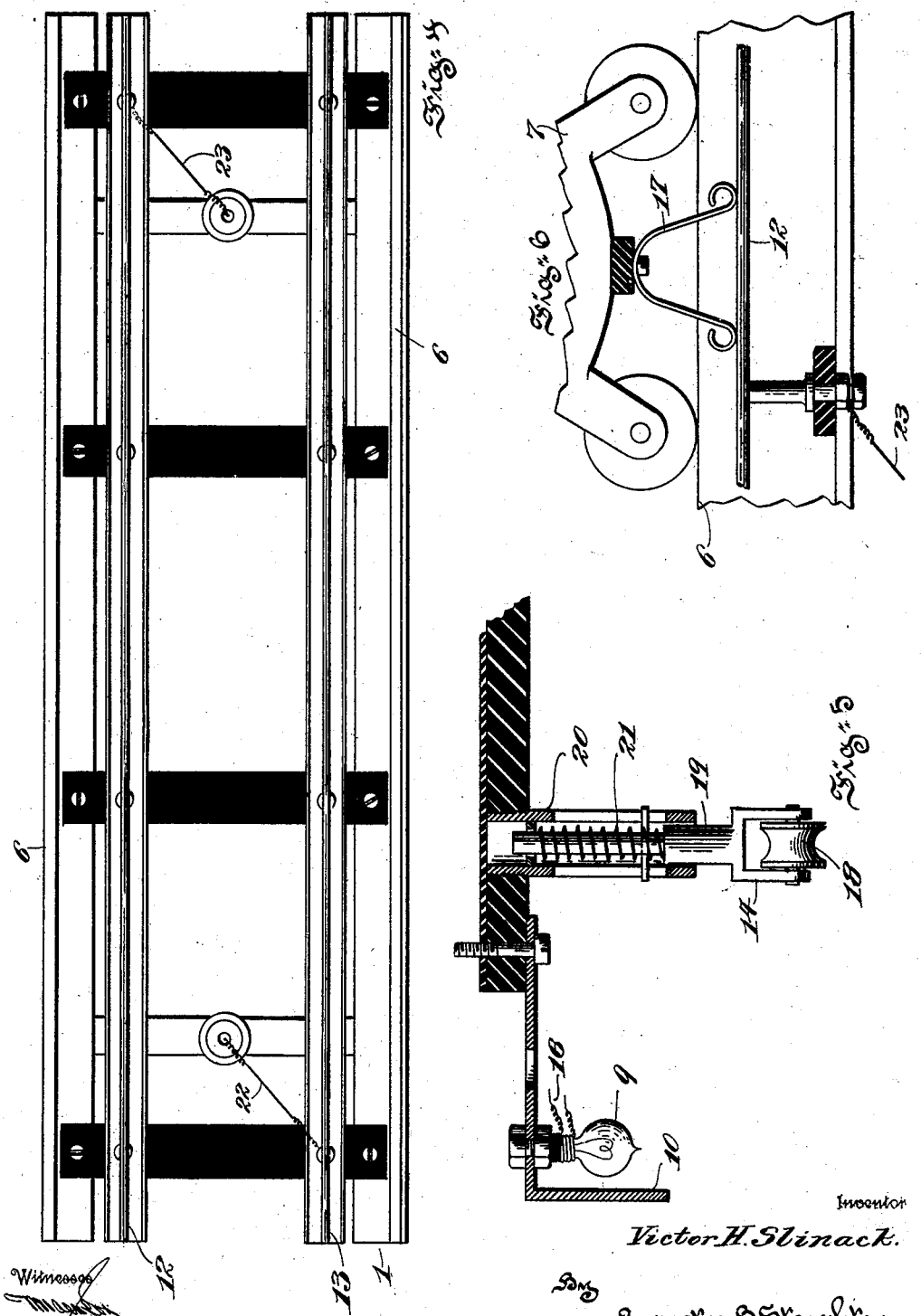

UNITED STATES PATENT OFFICE.

VICTOR H. SLINACK, OF PHILADELPHIA, PENNSYLVANIA, ASSIGNOR TO THE PENNSYLVANIA GAS GLOBE LIGHT COMPANY, OF PHILADELPHIA, PENNSYLVANIA, A CORPORATION OF PENNSYLVANIA.

PHOTOMETER.

No. 889,730.  Specification of Letters Patent.  Patented June 2, 1908.

Application filed March 16, 1908. Serial No. 421,340.

*To all whom it may concern:*

Be it known that I, VICTOR H. SLINACK, a citizen of the United States, and a resident of Philadelphia, in the county of Philadelphia and State of Pennsylvania, have invented certain new and useful Improvements in Photometers, of which the following is a specification.

The results obtained from the use of a photometer depend for their correctness largely upon the accuracy of the eyes of the observer, and as these tests are made in a dark room and require that readings be made from a scale, it follows that it is desirable to provide for illuminating the scale sufficient for it to be read without subjecting the eyes of the observer to any undue illumination.

It is one object of the present invention to provide for illuminating the scale of a photometer without creating any light or illumination such as would tend to impair the accuracy of the further observations made by the eyes of the observer.

To this end the invention comprises the improvements which will be finally claimed, but first described in connection with the apparatus shown in the drawings and chosen for the purpose of illustrating an application of the invention.

In the drawings, Figure 1, is a front view of a photometer provided with attachments or mechanism embodying features of the invention. Fig. 2, is a transverse sectional view of the same drawn to an enlarged scale. Fig. 3, is a view illustrating a detail of construction. Fig. 4, is a top or plan view showing a portion of the track of the photometer. Fig. 5, is a sectional view illustrating a detail of construction, and Fig. 6, is a front view illustrating a modification.

In the drawings 1, is a bar of the photometer and it is shown as arranged upon a table or stand 2, which also supports the meter 3, and the lights 4 and 5. The photometer bar 1, is provided with the usual tracks 6, upon which the carriage 7, is slidably mounted. Along the bar 1, is arranged the scale 8, in respect to which the position of the carriage 7, is noted. Upon the carriage 7 and in proper position for illuminating the scale 8, is arranged an electric lamp 9.

10, is a shield which covers the lamp so as to prevent its light from shining in the eyes of the operator and it may also operate as a reflector or device for concentrating the light upon the scale.

11, is a push button or switch for lighting and extinguishing the light 9.

There are tracks or ways 12 and 13, shown as arranged in open top conduits and which are connected with the opposite sides of a circuit, and there are collectors 14 and 15 connected with the carriage 7 and adapted to coöperate with the trolley-tracks or ways 12 and 13. The collectors are connected by a conductor 16, which includes the lamp 9, so that when the parts 12 and 13 are energized there is a circuit through the lamp. The collectors may consist of brushes 17, as shown in Fig. 6, or trolley wheels 18, as shown in the other figures. The trolley wheels 18, are mounted in shanks 19, which are slidably arranged in holders 20 and are operated upon by springs 21, which tend to hold them in proper contact with the rails 12 and 13.

22—23 is a conductor connecting the rails 12 and 13, and including the push button 11, and also a source of current, in this case shown to be the battery 24, although, of course, the character of the source is not material, nor is the precise arrangement of the circuit. The carriage may be moved back and forth and the collectors and rails serve to keep its lamp in connection with the source of current so that when the circuit is completed the light is lighted and the means for controlling the circuit may be stationary and therefore easily found, even in the dark. Furthermore the lighting of the lamp is accomplished without disturbing the bar itself or the carriage and it serves to momentarily illuminate the scale and in no way dazzles the eyes of the observer.

What I claim as new is,

1. The combination of a bar and carriage of a photometer with a lamp attached to the carriage and adapted to illuminate the scale, means independent of the bar and carriage for lighting and extinguishing the lamp, and slidable connections between said means and lamp whereby the carriage is free to be moved, substantially as described.

2. The combination with the scale and carriage of a photometer of collectors carried by the carriage, a lamp carried by the carriage and adapted to illuminate the scale, a circuit between the lamp and collectors, rails with which the collectors have movable contact, and means for energizing and deënergizing the rails to light and extinguish the lamp, substantially as described.

3. The combination with the support, scale bar and movable carriage of a photometer with a lamp and collectors electrically interconnected and carried by the carriage, of rails which coöperate with the collectors, and a push button carried by the support and having connections for energizing and deënergizing the rails, substantially as described.

4. The combination with the scale bar, fixed support and movable carriage of a photometer of an electric switch carried by the fixed support, a lamp carried by the carriage and adapted to illuminate the scale, and electrical connections interposed between the lamp and switch and including slidable collectors, substantially as described.

In testimony whereof I have hereunto signed my name.

VICTOR H. SLINACK.

In the presence of—
W. J. JACKSON,
FRANK E. FRENCH.